(12) United States Patent
Belenko et al.

(10) Patent No.: US 7,434,056 B2
(45) Date of Patent: Oct. 7, 2008

(54) WATERMARK-BASED COPY MANAGEMENT SYSTEM AND METHOD FOR DIGITAL MEDIA COPY PROTECTION

(75) Inventors: Vyacheslav S. Belenko, St. Petersburg (RU); Vsevolod M. Kuzmich, St. Petersburg (RU)

(73) Assignee: LG Electronics Inc., Seoul (KR)

( * ) Notice: Subject to any disclaimer, the term of this patent is extended or adjusted under 35 U.S.C. 154(b) by 566 days.

(21) Appl. No.: 10/078,272

(22) Filed: Feb. 20, 2002

(65) Prior Publication Data

US 2002/0114459 A1 Aug. 22, 2002

Related U.S. Application Data

(60) Provisional application No. 60/269,846, filed on Feb. 21, 2001.

(51) Int. Cl.
*H04L 9/00* (2006.01)
(52) U.S. Cl. .................. 713/176; 713/180; 382/100; 380/201
(58) Field of Classification Search ............... 380/201, 380/202, 203; 705/54, 57; 369/53.21, 94; 713/200, 176, 180; 382/100; 283/113; 358/3.28; 348/E7.061; 704/E21.001
See application file for complete search history.

(56) References Cited

U.S. PATENT DOCUMENTS

| | | | |
|---|---|---|---|
| 5,809,139 A | 9/1998 | Girod et al. | |
| 5,974,150 A | 10/1999 | Kaish et al. | |
| 6,044,462 A | 3/2000 | Zubeldia et al. | |
| 6,148,342 A | 11/2000 | Ho | |
| 6,226,618 B1 | 5/2001 | Downs et al. | |
| 6,229,894 B1 | 5/2001 | Van Oorschot et al. | |
| 6,246,767 B1 | 6/2001 | Akins, III et al. | |
| 6,310,956 B1 * | 10/2001 | Morito et al. | 380/201 |
| 6,358,596 B1 | 3/2002 | Mehta et al. | |
| 6,367,019 B1 | 4/2002 | Ansell et al. | |
| 6,385,596 B1 | 5/2002 | Wiser et al. | |
| 6,389,403 B1 | 5/2002 | Dorak, Jr. | |
| 6,398,245 B1 | 6/2002 | Gruse et al. | |

(Continued)

OTHER PUBLICATIONS

Bender et al., "Techniques for Data Hiding," IBMSystems Journal, vol. 35, Nos. 3&4, pp. 313-336, dated 1996.

(Continued)

*Primary Examiner*—Thanhnga B Truong
(74) *Attorney, Agent, or Firm*—KED & Associates, LLP

(57) ABSTRACT

Watermark-based copy management method and system for digital copy protection are disclosed. The system includes a copy control information analyzer analyzing a first copy control information included in an original watermark embedded into an original media data set, the first copy control information being set to one of "copy freely", "copy for display only", "copy one generation", "copy never", and "no more copies"; a playing element playing the original media data set only if the first copy control information is set to "copy one generation"; a watermark generator embedding a player watermark into the played data set, the player watermark including a second copy control information set to "no more copies"; and a recording device recoding the player watermark-embedded media data set. One of the primary goals of the present invention is to reliably embed copy control information into the played media signal by a copyright owner of the media and by a playing device using a watermark technology.

14 Claims, 1 Drawing Sheet

U.S. PATENT DOCUMENTS

| | | | |
|---|---|---|---|
| 6,404,926 B1 | 6/2002 | Miyahara et al. | |
| 6,418,421 B1 | 7/2002 | Hurtado et al. | |
| 6,550,011 B1 | 4/2003 | Sims, III | |
| 6,611,599 B2 | 8/2003 | Natarajan | |
| 6,611,607 B1 * | 8/2003 | Davis et al. | 382/100 |
| 6,633,723 B1 * | 10/2003 | Kuroda et al. | 386/94 |
| 6,678,389 B1 | 1/2004 | Sun et al. | |
| 6,678,464 B1 | 1/2004 | Kawai et al. | |
| 6,687,822 B1 | 2/2004 | Jakobsson | |
| 6,707,774 B1 * | 3/2004 | Kuroda et al. | 369/53.21 |
| 6,741,991 B2 | 5/2004 | Saito | |
| 6,802,011 B1 * | 10/2004 | Ogino | 713/200 |
| 6,853,676 B2 | 2/2005 | Kim | |
| 6,891,958 B2 | 5/2005 | Kirovski et al. | |
| 7,000,113 B1 * | 2/2006 | Linnartz | 713/176 |
| 7,002,710 B1 * | 2/2006 | Van Liew et al. | 358/3.28 |
| 7,047,554 B1 | 5/2006 | Lortz | |
| 7,100,048 B1 | 8/2006 | Czajkowski et al. | |
| 2001/0010046 A1 | 7/2001 | Muyres et al. | |
| 2001/0032312 A1 | 10/2001 | Runje et al. | |
| 2001/0053223 A1 | 12/2001 | Ishibashi et al. | |
| 2002/0010861 A1 | 1/2002 | Matsuyma et al. | |
| 2002/0021805 A1 | 2/2002 | Schumann et al. | |
| 2002/0071566 A1 | 6/2002 | Kurn | |
| 2002/0118838 A1 | 8/2002 | Belenko et al. | |
| 2002/0191809 A1 | 12/2002 | Kirovski et al. | |
| 2003/0048922 A1 | 3/2003 | Rhoads | |
| 2004/0034781 A1 | 2/2004 | Natarajan | |
| 2004/0059936 A1 | 3/2004 | Wakao et al. | |
| 2004/0131184 A1 | 7/2004 | Wu et al. | |
| 2005/0018873 A1 | 1/2005 | Rhoads | |
| 2005/0058318 A1 | 3/2005 | Rhoads | |
| 2005/0097333 A1 | 5/2005 | Kirovski et al. | |
| 2005/0097334 A1 | 5/2005 | Kirovski et al. | |
| 2005/0196013 A1 | 9/2005 | Rhoads | |

OTHER PUBLICATIONS

F. Hartung et al., Multimedia Watermarking Techniques, Proc. IEEE, vol. 87, No. 7, pp. 1079-1107, Jul. 1999.

Wolfgang et al., "Overview of image security techniques with applications in multimedia systems," Proceedings of the SPIE Conference on Multimedia Networks: Security, Displays, Terminals, and Gateways, Vol. 3228, Nov. 2-5, 1997, Dallas, TX, pp. 297-308.

* cited by examiner

WATERMARK-BASED COPY MANAGEMENT SYSTEM AND METHOD FOR DIGITAL MEDIA COPY PROTECTION

CROSS-REFERENCE TO RELATED APPLICATIONS

This application claims the benefit of U.S. Provisional Application No. 60/269,846, filed on Feb. 21, 2001, in the name of inventors Vyacheslav S. Belenko and Vsevolod M. Kuzmich, titled "Watermark-Based Copy Management System for Digital Media Copy Protection", which is hereby incorporated by reference as if fully set forth herein.

BACKGROUND OF THE INVENTION

1. Field of the Invention

The present invention relates to media copy protection, and more particularly, to digital media copy management method and system that control each copy generation process and prevent any unauthorized (illegal) digital media data copy.

2. Discussion of the Related Art

Watermarking is a technology, in which copyright information (information indicating a copy guard) is expressed by a watermark superposed in media data. Such information is embedded into various media data including image data and sound data, and it should be invisible and inaudible to a human observer. The purpose of superposing a watermark in the media data is to provide a proof of a copyright so that an illegal use and copy of the media data can be prevented. Therefore, the copyright information should stay stable in a host signal even when the host signal is subjected to any data process.

The technique for superposing a watermark in the media data depends on the size of the watermark data and the invariance of the watermark data to any data process of a host signal. There is a watermark inherent trade-off between the human perceptibility, bandwidth, and robustness (i.e., the degree to which the data are immune to be attacked or transformations that occur to the host signal through a normal usage). The more data to be superposed, the less secure the encoding process is. The less data to be superposed, the more secure the encoding process is.

The currently existing solutions for the media data protection and data copy control do not fully eliminate or significantly reduce digital media piracy. Therefore, it is essential that a new protection technology should be provided.

SUMMARY OF THE INVENTION

Accordingly, the present invention is directed to a copy protection method for digital media data that substantially obviates one or more problems due to limitations and disadvantages of the related art.

An object of the present invention is to provide a watermark-based copy management system for digital media copy protection that protects a media data set by embedding copy control information into the media using a watermarking technology.

Another object of the present invention is to provide a watermark-based copy management method for digital media copy protection that protects a media data set by embedding copy control information into the media using a watermarking technology.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a watermark-based copy management method includes receiving an original media data set that includes an original watermark, the original watermark including a first copy control information which is set to one of "copy freely", "copy for display only", "copy one generation", "copy never", and "no more copies"; analyzing the first copy control information to determine whether the first copy control information is set to "copy one generation"; playing the original media data set only if the first copy control information is set to "copy one generation"; embedding a player watermark into the played media data set, the player watermark including a second copy control information set to "no more copies"; and transferring the player watermark-embedded media data set to a recording device.

In another aspect of the present invention, a watermark-based copy management method includes receiving an original media data set that includes an original watermark, the original watermark including a first copy control information which is set to one of "copy freely", "copy for display only", "copy one generation", "copy never", and "no more copies"; analyzing the first copy control information to determine whether the first copy control information is set to "copy one generation"; playing the original media data set only if the first copy control information is set to "copy one generation"; embedding a player watermark into the played media data set, the player watermark including a second copy control information set to "copy for display only"; and transferring the player watermark-embedded media data set to a displaying device.

In another aspect of the present invention, a watermark-based copy management system includes a copy control information analyzer analyzing a first copy control information included in an original watermark embedded into an original media data set, the first copy control information being set to one of "copy freely", "copy for display only", "copy one generation", "copy never", and "no more copies"; a playing element playing the original media data set only if the first copy control information is set to "copy one generation"; a watermark generator embedding a player watermark into the played data set, the player watermark including a second copy control information set to "no more copies"; and a recording device recoding the player watermark-embedded media data set.

In another aspect of the present invention, a watermark-based copy management system includes a copy control information analyzer analyzing a first copy control information included in an original watermark embedded into an original media data set, the first copy control information being set to any one of "copy freely", "copy for display only", "copy one generation", "copy never", and "no more copies"; a playing element playing the original media data set only if the first copy control information is set to "copy one generation"; a watermark generator embedding a player watermark into the played data set, the player watermark including a second copy control information set to "copy for display only"; and a displaying device displaying the player watermark-embedded media data set.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
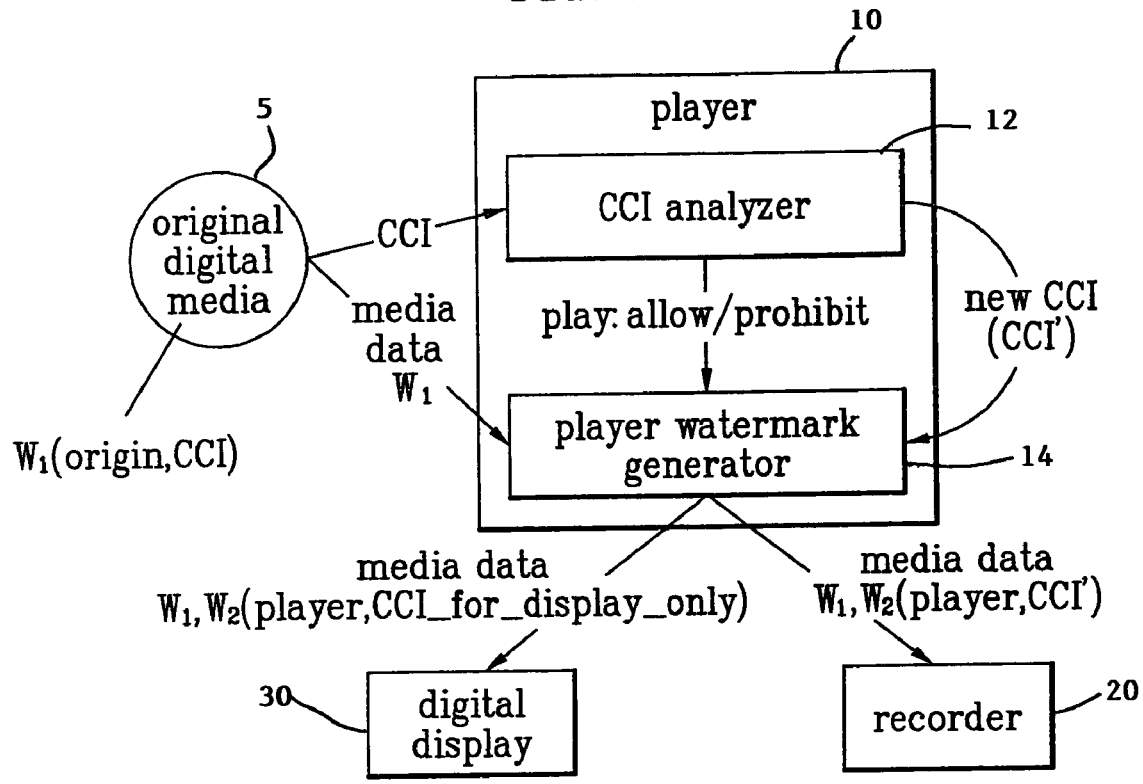
FIG. 1 illustrates the media copy management method and system for playing an original media data set in accordance with the present invention.

Reference will now be made in detail to the preferred embodiments of the present invention, examples of which are illustrated in the accompanying drawings. Wherever possible, the same reference numbers will be used throughout the drawings to refer to the same or like parts.

In the media copy management method and system of the present invention that employ a digital watermarking technique, the copy management information of a digital media data set is represented by a watermark, which is embedded into the data set. There are two types of watermark considered in the present invention: an original watermark (W1) generated by a media or content owner (publisher) and a secondary watermark (W2) generated by a media-playing device.

An original media data set contains an original watermark (W1), which is embedded into the media data set by a media owner. The original watermark includes the watermark type, the identification information of the media copyright owner, and Copy Control Information (CCI) of the media data set. The watermark type is for determining whether the watermark embedded in a media data set is an original watermark or a secondary watermark. The media owner's copyright identification is used to bind the media owner with the media data set. Finally, CCI is used for managing and controlling the media data copying process.

A legal media data set must include only one original watermark (W1). Namely, when a media data set contains two or more different original watermarks, the media data set is considered to be illegal and unplayable. Similarly, if a media data set contains two or more secondary watermarks, the media data set is also considered to be illegal and unplayable. Therefore, a legal media data set should include only one secondary watermark.

In one of the existing multimedia copyright protection methods, CCI is encoded into two bits data and has one of the following values: 00 representing "copy-freely", 01 representing "reserved for future use", 10 representing "copy one generation", and 11 representing "copy never" or "no more copies".

Another existing multimedia copyright protection method employs Encryption Mode Indicator (EMI) for representing CCI. The value of the EMI bits can be one of the following values: 00 representing "copy freely", 01 representing "no more copies", 10 representing "copy one generation", and 11 representing "copy never."

As it is shown above, the existing copyright protection methods do not consider the possibility of distinguishing a media for displaying only from an original media data set or a media copy. The copy management method and system of the present invention eliminate this disadvantage by representing CCI with one of the following values: 00 for "copy freely", 01 for "copy for display only", 10 for "copy one generation", and 11 for "copy never" or "no more copies."

A media data set including an original or secondary watermark marked with "copy for display only" is considered to be illegal and unplayable. A media data set including an original watermark marked with "copy freely" is not subject to any copy control management. That is, the data set should be kept unchanged during its playback process. A media data set marked with "copy freely" in its secondary watermark, but not in its original watermark, is considered to be illegal and unplayable. Therefore, only a media data set marked with "copy one generation" in its original watermark is subject to a complete digital media copy management.

When an original media data set 5 is to be played in a playing device 10 as shown in FIG. 1, the CCI analyzer 12 of the playing device initially analyzes the CCI of the data set. The playing device prohibits playing the media data set for any one of the above-mentioned cases. Then the player watermark generator 14 processes the played signal and performs a watermark embedding process. If the played media signal is marked with "copy never" or "no more copies", no signal should be issued to a recorder 20. Otherwise, the played signal may be recorded by the recorder. The recorded media signal contains an original watermark (W1) and a secondary watermark (W2) with an updated CCI. The CCI updating process is performed only for a media data set marked with "copy one generation". In the CCI updating process, "copy one generation" will be substituted with "no more copies." On the other hand, when the playing device is subject to transfer the original media data set to a displaying device, "copy one generation" will be substituted with "copy for display only".

Figure 2:
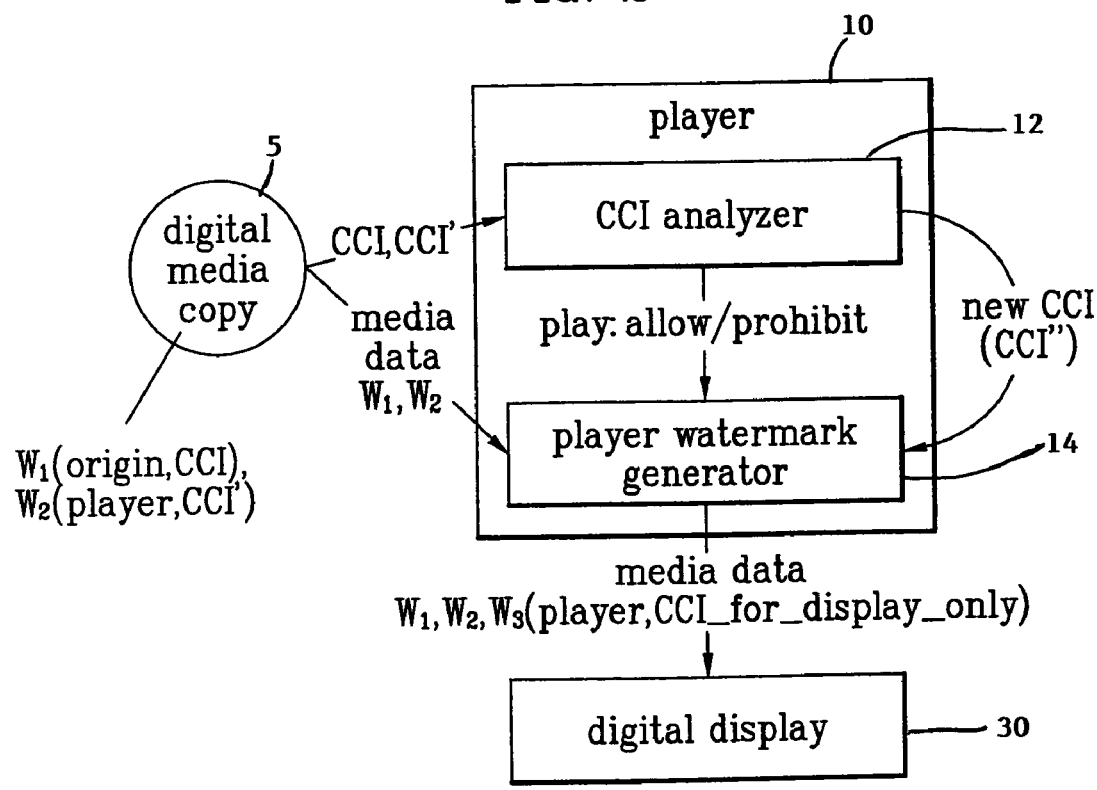
FIG. 2 illustrates the media copy management method and system for playing a media copy in accordance with the present invention.

When a media copy 5 is to be played in a playing device 10 as shown in FIG. 2, the CCI analyzer 12 of the playing device initially analyzes the CCI of the media copy. The playing device 10 prohibits playing the copy for any one of the above-mentioned cases. In addition, the playing device analyzes the second watermark (W2). If it is determined that the second watermark (W2) conflicts with the original watermark (W1) in terms of copy control, the media copy is considered to be illegal and unplayable. When the media copy is played, the played signal may only be displayed by a digital displaying device 30.

The player identification of the playing device shown in FIG. 2 should be embedded into the played signal together with the CCI. This identification may contain the player vendor, model number, and unique serial number. This information is intended to help detecting the origin of the media copy and may be used for the revocation of the compromised devices or their keys.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A watermark-based copy management method for digital media copy protection, the method comprising:

receiving an original media data set that includes a watermark, said watermark including a watermark type indicating whether said watermark is an original watermark generated by a media or content owner or is a secondary watermark generated by a media-playing device, a media owner identification information indicating a media owner and a first copy control information for managing and controlling a media data copying process, said first copy control information being set to one of "copy freely", "copy one generation", "copy never", and "no more copies";

playing said original media data set only if said first copy control information is set to "copy freely" or "copy one generation";

embedding a player watermark into said played media data set if said first copy control information is set to "copy one generation", said player watermark including a second copy control information set to "no more copies" and player identification informanon including a model number and a unique serial number, wherein the second copy control information is derived from said first copy control information; and transferring said player watermark-embedded media data set to an external device.

2. The method of claim 1, wherein said player identification information further includes a player vendor.

3. The method of claim 1, wherein said second copy control information is set to "copy for display only" if said performed media data set is to be transferred to a displaying device, said "copy for display only" distinguishing a media data set for display only from said original media data set or a copied media data set for record.

4. A watermark-based copy management method for digital media copy protection, the method comprising:

receiving an original media data set that includes a watermark, said watermark including a watermark type indicating whether the watermark is an original watermark generated by a media or content owner or is a secondary watermark generated by a media-playing device, a media owner identification information indicating a media owner and a first copy control information for managing and controlling a media data copying process, said first copy control information for indicating at least whether copying said original media data is permitted;

performing an operation according to whether said first copy control information indicates that said copying is permitted; and embedding a device watermark into said performed media data set and transferring said device watermark embedded media data set to an external device, said device watermark including a second copy control information derived from said first copy control information and a device identification information including a model number and a unique serial number.

5. The method of claim 4, wherein said device identification information is used to detect an origin of said performed media data set, thereby performing a revocation of a compromised device or their key.

6. The method of claim 4, wherein said device identification information further includes a device name.

7. The method of claim 4, wherein said media owner identification information is used to bind said media owner with said media data set.

8. A watermark-based copy management system for digital media copy protection, the system comprising:

a copy control information analyzer analyzing a first copy control informanon included in a watermark embedded into an original media data set, said first copy control information being set to one of "copy freely", "copy one generation", "copy never", and "no more copies", wherein said watermark includes a watermark type indicating whether said watermark is an original watermark generated by a media or content owner or is a secondary watermark generated by a media-playing device and a media owner identification information indicating a media owner;

a playing element playing said media data set if said first copy control information is set to "copy freely" or "copy one generation";

a watermark generator embedding a player watermark into said played data set if said first copy control information is set to "copy one generation", said player watermark including a second copy control information set to "no more copies" and player identification information including a model number and a unique serial number, said second copy control information is derived from said first copy control information; and a recording device recording said player watermark-embedded media data set.

9. The system of claim 8, wherein said player identification information further includes a player vendor.

10. The system of claim 8, wherein said watermark generator embeds said device watermark including said second control information set to "copy for display only" if said performed media data set is to be transferred to a displaying device, said "copy for display only" distinguishing a media data set for display only from said original media data set or a copied media data set for record.

11. A watermark-based copy management system for digital media copy protection, the system comprising:

a copy control information analyzer analyzing a first copy control information included in a watermark embedded into an original media data set, said first copy control information required for determining at least whether copying said original media data is permitted, wherein said watermark includes a watermark type indicating whether the watermark is an original watermark generated by a media or content owner or is a secondary watermark generated by a media-playing device and a media owner identification information indicating a media owner;

an operation element performing an operation according to an analyzed result of said copy control information analyzer; and a watermark generator embedding a device watermark into said performed media data set and transferring said device watermark embedded media data set to an external device, said device watermark including a second copy control information and device identification information including a model number and a unique serial number.

12. The system of claim 11, wherein said device identification information is used to detect an origin of said performed media data set, thereby performing a revocation of a compromised device or their key.

13. The system of claim 11, wherein said device identification information further includes a device name.

14. The system of claim 11, wherein said media owner identification information is used to bind said media owner with said media data set.

* * * * *